Aug. 28, 1956    J. B. DES ROSIERS    2,760,602
SELF-ADJUSTING BRAKE
Filed June 19, 1951    2 Sheets-Sheet 2
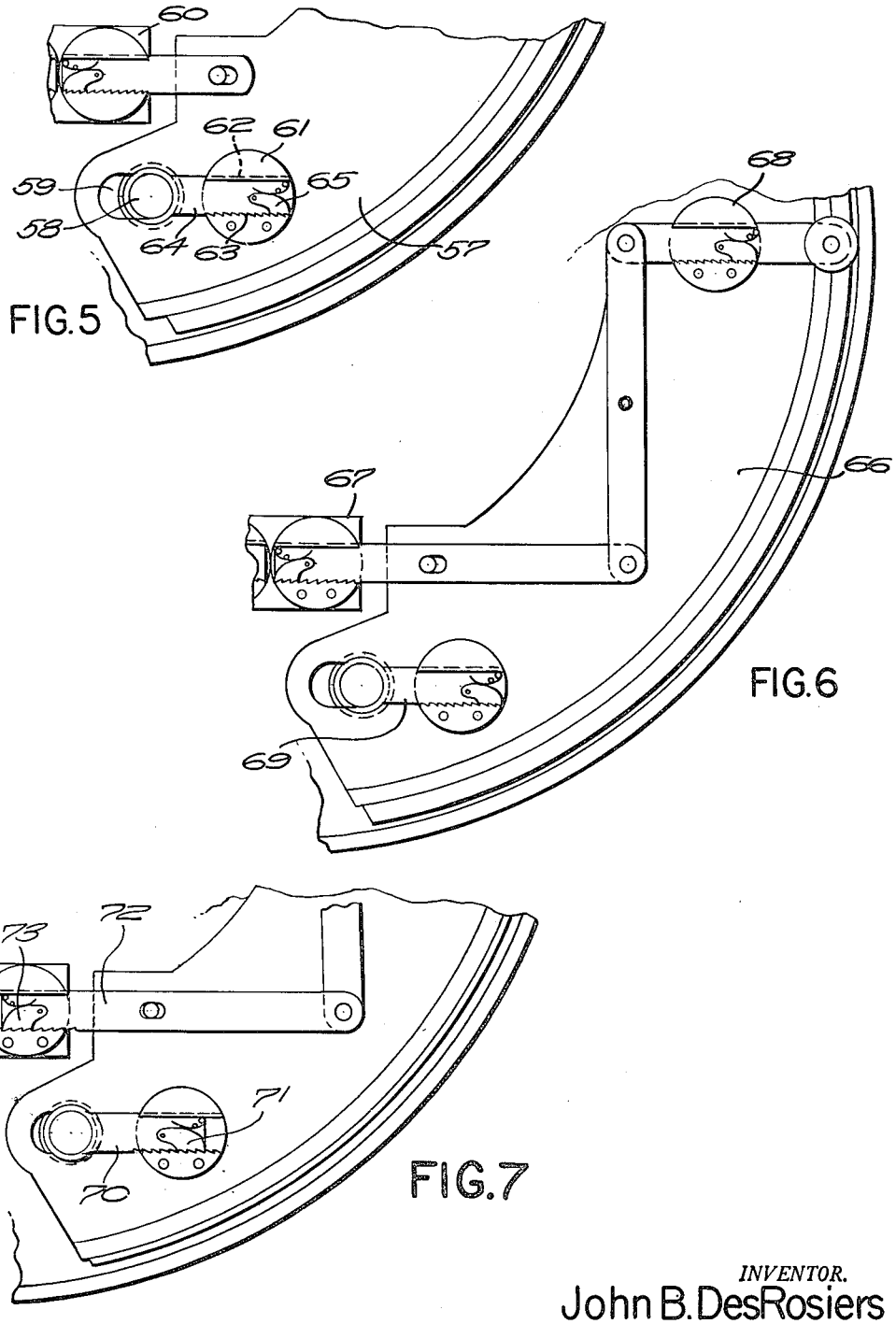
INVENTOR.
John B. DesRosiers
BY
ATTORNEY United States Patent Office 2,760,602
Patented Aug. 28, 1956

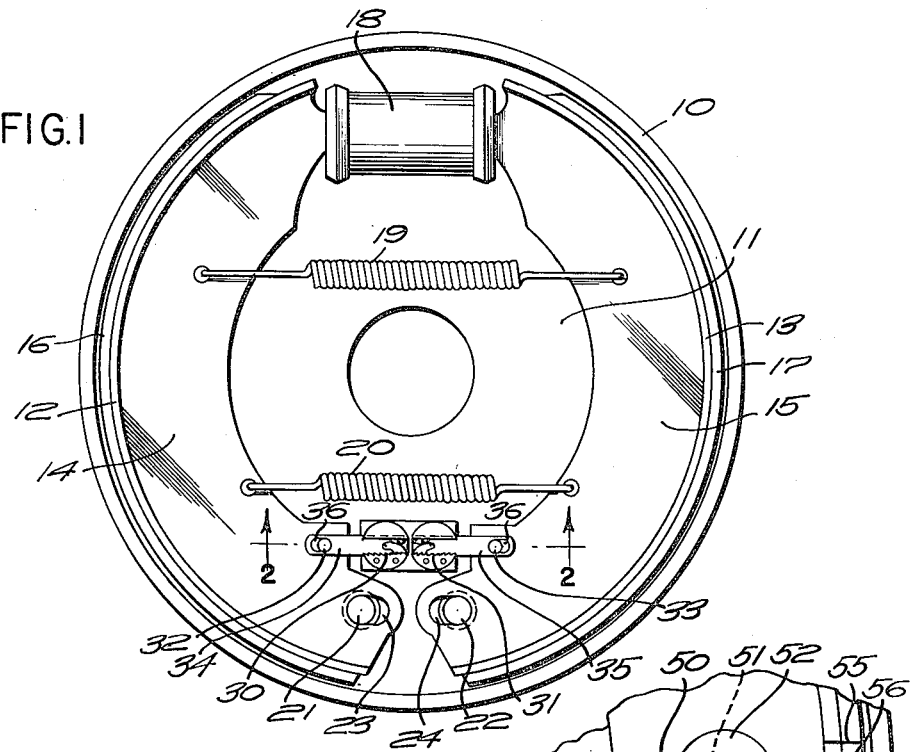
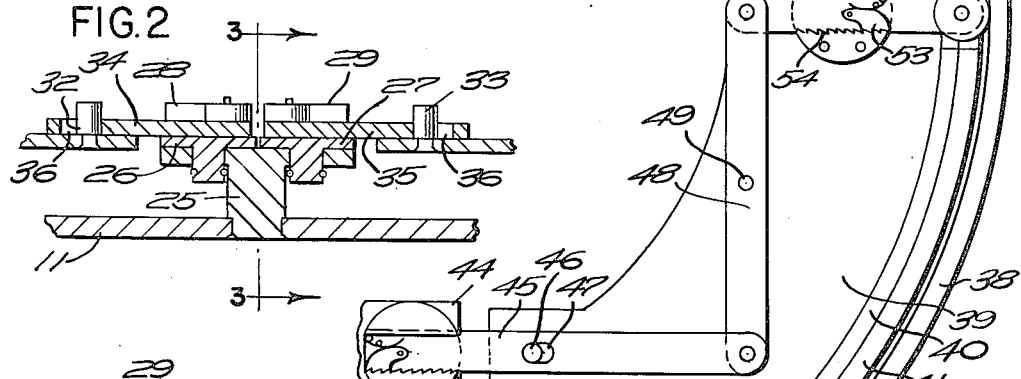
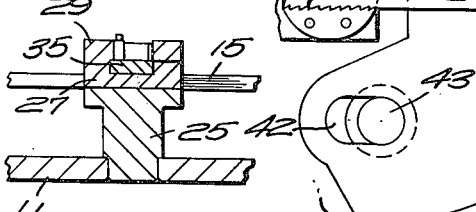

2,760,602

SELF-ADJUSTING BRAKE

John B. Des Rosiers, Providence, R. I.

Application June 19, 1951, Serial No. 232,388

18 Claims. (Cl. 188—79.5)

My present invention relates to braking mechanisms, and more particularly to a self-adjusting brake.

The present invention constitutes an improvement over my United States Patent No. 2,002,139, entitled Automatic Brake Adjusting and Indicating Mechanism, issued May 21, 1935, and over my co-pending application for Patent Serial No. 173,744, filed July 14, 1950, for Automatic Brake Adjusting and Indicating Means, now abandoned.

The principal object of the present invention is to provide a braking mechanism which is self-adjusting, so as to compensate for the wear on the brake shoe.

Another object of the present invention is to provide for a self-adjusting braking mechanism which will compensate for the angle of contact between the brake shoe and the brake drum.

A further object of the present invention is to provide a self-adjusting device for a brake which is simple in construction and easy to assemble with the brake.

Another object of the present invention is to provide a type of self-adjusting brake which can provide up to three points of adjustment on the brake.

With the above and other objects and advantageous features in view, my invention consists of a novel arrangement of parts, more fully disclosed in the detailed description following, in conjunction with the accompanying drawings, and more particularly defined in the appended claims.

Referring to the drawings:

Fig. 1 is a plan view of an automotive brake having a single adjustment embodying my invention.

Fig. 2 is a section thereof taken through line 2—2 on Fig. 1.

Fig. 3 is a section taken through line 3—3 on Fig. 2.

Fig. 4 is a plan view, on a larger scale than Fig. 1, of a portion of a brake mechanism showing two points of adjustment.

Fig. 5 is a plan view of a portion of a brake mechanism showing a third point of adjustment.

Fig. 6 is a plan view of a portion of a brake mechanism showing all three points of adjustment in a single brake construction, and Fig. 7 is a similar view of the parts after adjusted for wear.

As pointed out in my patent and patent application hereinabove referred to, it is desirable to provide some means of automatic adjustment of a brake to eliminate the necessity of periodically adjusting the brakes of a vehicle to compensate for the wear of the braking surface. The necessity for taking up on the brakes of a vehicle is caused by a widening of the distance between the brake shoe and the brake drum, which is in turn caused by the wearing away of the surface of the brake shoe. I have provided various types of automatic adjustments wherein the brake shoe will be retained in a preset position a predetermined distance from the brake drum no matter what the wear on the shoe. Such a construction will provide a constant and even braking action for the same movement of the brake pedal throughout the life of the brake lining. The present invention constitutes an improvement on my prior constructions by insuring proper contacting angles between the brake shoe and the brake drum after adjustment and for providing multiple points of adjustment, if desired.

Referring to the drawings embodying my invention, Fig. 1 is a plan view of a standard automotive brake. While the present invention is described as being attached to an automotive brake, it is obvious that the principle can readily be applied to any other type of braking mechanism.

The brake comprises a brake drum 10, which is part of and rotates with the vehicle wheel (not shown). A back plate 11 acts as a carrier or housing for the various parts of the brake mechanism within the circumference of the drum 10. Mounted on the plate 11 are two brake shoes 12 and 13 integral with and at right angles to plates 14 and 15. The brake shoes 12 and 13 are provided on their outer surfaces with conventional brake linings 16 and 17. The brake shoes 12 and 13 and the plates 14 and 15 are adapted to be expanded or forced outwardly against the brake drum 10 by means of the hydraulic cylinder 18 in the conventional manner. Return movement of the plates 14 and 15, when the brake is released, is provided by a pair of springs 19 and 20. In the conventional braking mechanism, the lower ends of the plates 14 and 15 ride on a fixed pivot, so that initially when the cylinder 18 causes an expanded action at the upper ends of the plates 14 and 15, the brake linings 16 and 17 are pressed against the brake drum 10 at an arcuate angle. The pivot points for the lower ends of the plates 14 and 15 are, therefore, set to provide the maximum braking surface. However, after the linings 16 and 17 have worn down and an adjustment is made to compensate therefor, the arcuate angle is lengthened so that the proper maximum braking surface is no longer obtained. To avoid this, I provide floating pivot points at the bottom ends of the plates 14 and 15. This comprises pivot members 21 and 22 which are fixed on the back plate 11 and extend through elongated slots 23 and 24 in the plates 14 and 15 respectively.

The self-adjusting mechanism is mounted on the back plate 11 adjacent the lower end of the brake and just above the pivot posts 21 and 22, as shown in Fig. 1. It comprises a T-shaped block 25 which is fixed to the back plate 11, as shown in Figs. 2 and 3. A pair of members 26 and 27 are mounted on the top of the horizontal portions of the block 25 and adapted to freely rotate on the block. Each member 26 and 27 is provided with an annular top portion 28 and 29 having a transverse slot extending across the upper end thereof. The lower inner edge of each slot is provided with ratchet teeth 30 and 31 at an angle towards the adjacent plate, either 14 or 15, for example, the teeth 30 on the member 26 extending towards the plate 14 and the teeth 31 on the member 27 extending toward the plate 15.

The plates 14 and 15 are provided with fixed pivot posts 32 and 33. I now provide an adjusting bar extending from each plate, the bar 34 extending from the plate 14 and the bar 35 extending from the plate 15. One end of each bar 34 and 35 is provided with an elongated slot 36 surrounding the pivot posts 32 and 33. The other end of each bar extends slidably into the transverse slots in the annular portions 28 and 29. The end of each bar is provided with a spring pressed pawl 37 adapted to engage the teeth 30 and 31 in these slots, as shown in Fig. 1.

With the parts positioned as hereinabove described and the brake in an "off" position, as shown, the pivot posts 32 and 33 will be at the extreme inner ends of the slots 36. It will be noted also that the pivot posts 21 and 22 will be at the extreme outer ends of the slots 23 and 24. The brake is applied by the hydraulic cylinder 18 causing the upper ends of the plates 14 and 15 to expand outwardly away from each other until the brake linings 16 and 17 engage the brake drum 10. With this movement, the lower ends of the plates 14 and 15 will move about the pivot posts 21 and 22 and will move the pivot posts 32 and 33 away from each other within the slots 36. This is accompanied with a slight arcuate movement, but the members 26 and 27 being pivotally mounted on the block 25 will rotate sufficiently to compensate for the arcuate movement on the bars 34 and 35.

When the brake is released, the plates 14 and 15 will be drawn towards each other by the springs 19 and 20. The pivot posts 32 and 33 will then slide inwardly towards each other at the inner ends of the slots 36 into the position shown in Fig. 1. It is quite evident that as the brake linings 16 and 17 wear away, the plates 14 and 15 will travel a further distance outwardly to apply the brakes. In doing so, the pivot posts 32 and 33 will not only reach the outer limits of the slots 36, but will go beyond that, depending on the amount of wear on the brake linings. In moving beyond the ends of the slots, the posts 32 and 33 will drag the bars 34 and 35 with them, pulling the bars slightly out of the transverse slots in the members 28 and 29. Now, when the brake is again released, the bars 34 and 35 will be in a new position, and as the plates 14 and 15 are pulled together again by the springs 19 and 20, the posts 32 and 33 will permit the plates to move only the lengths of the slots 36. When the inner end of the slots 36 is reached, the pawl and ratchet arrangement will prevent further inward movement. Thus, the movement of the plates 14 and 15 is limited to the length of the slots 36. Since the bars 34 and 35 will follow the outward movement of the plates 14 and 15 as the linings wear away, the length of braking movement will be a fixed factor.

To prevent distortion, the lower ends of the plates 14 and 15 will move outwardly as they are retained in outward position by the adjustment arrangement. This is accomplished by the posts 21 and 22 and slots 23 and 24. If the lower pivot arrangement were fixed, then the upper end of the plates 14 and 15 would normally be retained in slightly expanded position as the linings wear away and the full braking power could never again be attained. By allowing the upper ends of the plates 14 and 15 to retract completely into the cylinder 18, the self-adjusting mechanism hereinabove described is compensated for by the movement of the lower end of the plates 14 and 15, which in effect changes the pivotal point as the brake linings 16 and 17 wear away.

The above arrangement, therefore, provides a simple, efficient and economically inexpensive method of providing for an automatic adjustment of a braking mechanism. The basic principle of the adjustment is that the normal braking distance between the brake shoe and the brake drum is built into the length of the slots 36 and the position of the slots 36 is adapted to be changed to follow the plates 14 and 15 as the brake linings 16 and 17 wear away.

It may sometimes be desirable to provide a more sensitive arrangement than that shown in Fig. 1. If so, the arrangement shown in Fig. 4 may be used. In this form, the brake drum 38, plate 39, brake shoe 40 and brake lining 41 are identical with the form shown in Fig. 1. The lower end of the plate is also provided with a slot 42 and the pivot post 43 also similarly to the form shown in Fig. 1. However, the self-adjusting construction 44, which is generally the same as the one shown in Fig. 1, is now provided with an adjusting bar 45 which extends beyond the pivot post 46 and slot 47. At the outer end of the bar 45, a bar 48 is pivotally attached thereto, the bar 48 acting as a lever and being centrally pivotally mounted as at 49 on the plate 39. The other end of the bar 48 is pivotally attached to an adjusting bar 50 which extends through a transverse slot 51 in the rotatable member 52 mounted in the plate 39 similarly to the mounting of the members 26 and 27. As in the previous forms, the bar 50 is provided with a spring pressed pawl 53 bearing against the ratchet teeth 54 in the slot 51. The outer end of the bar 50 passes through an opening 55 in the brake shoe 40 and the brake lining 41 and is provided with a roller 56.

With the parts assembled as shown in Fig. 4, the outer edge of the roller 56 will come in contact with the inner surface of the brake drum 38 each time that the brake is applied. As the brake lining 41 wears away, the roller 56 will be pushed inwardly by the brake drums 38 each time that the brake is applied. This will move the bar 50 inwardly and cause the bar 48 to turn on its pivot 49. This will in turn pull the bar 45 out towards the direction of movement of the plate 39. Since this is the normal adjusting movement originally provided in the form shown in Fig. 1, the arrangement hereinabove described adds a second point of contact for insuring the adjusting movement of the bar 45. The adjusting action, when the brake is released, still takes place at the construction 44, bar 45, post 46 and slot 47, as described and shown in Fig. 1.

The construction shown in Fig. 4, therefore, provides the adjusting mechanism with an extended lever arrangement which is sensitive to the exact distance between the brake drum 38 and the brake lining 41. The same arrangement can be applied to the opposite half of the brake.

As hereinabove described, the lower ends of the plates 14 and 15 are automatically moved in the slots 23 and 24 about the pivot posts 21 and 22 when an adjustment is made. However, this will compensate for the different angle of movement of the two main brake parts, and also provides a floating pivot point at the lower end of the plates. This can be compensated for, if desired, by the construction shown in Fig. 5.

In the form shown in Fig. 5, the plate 57 is pivotally mounted on the fixed pivot pin 58 which extends through the elongated slot 59 in the plate. The adjusting mechanism 60 is similar to that described in Fig. 1. Mounted on the plate 57 is a member 61 similar to the annular members 28 and 29, and adapted to be rotatably mounted on the plate. The upper surface of the member 61 is provided with a transverse slot 62, having ratchet teeth 63 at its lower edge. A connecting bar 64 is fixed to the pivot post 58 and extends into the transverse slot 62 as shown in Fig. 5. The bar 64 is provided with a spring pressed pawl 65 adapted to engage the teeth 63.

With the above construction, when the adjustment is made by the construction 60 to compensate for the wear on the brake linings, the plate 57 will move outwardly towards the brake drum, this movement being permitted by the elongated slot 59 about the pivot post 58. With this movement, the bar 64 will be drawn slightly out of the slot 62 to assume a new position. Now, when the brake is again applied and the upper end of the plate 57 is under hydraulic pressure, the connection between the ratchet and pawl 63 and 65 and the bar 64 attached to the post 58 will insure a firm pivot for the lower end of the plate 57. This arrangement, therefore, insures a firm, direct pivotal contact between the plate 57 and the pivot post 58 in any position of the post within the slot 59.

The aforementioned arrangements may be used either singly or in combination, as shown in Figs. 6 and 7. In this form, the plate 66 is provided with the adjustment mechanism 67, as described in the arrangement shown in Fig. 1, the more sensitive control arrangement 68 as described in the arrangement shown in Fig. 4, and the positive pivot arrangement 69, as described in the arrangement shown in Fig. 5. Where all three devices are used, the brake will have a positive sensitive automatic adjustment, with a similar lower pivot member which will compensate for the changes in the angle of movement of the brake members with respect to the brake drum.

As can be seen in Fig. 7, after the lining has worn down, the bar 70 has been pulled to the left as compared with Fig. 6, so that the pawl and ratchet arrangement 71 has been moved two or three teeth inwardly changing the position of the lower pivot. Simultaneously, the bar 72 has been pulled to the right as compared to Fig. 6 and the pawl and ratchet arrangement 73 has been pulled two or three teeth inwardly to insure the same braking distance between the brake lining and the drum no matter what the wear on the lining.

The above constructions, therefore, provide a simple and economical method of automatically adjusting the brake to compensate for the wear on the linings. This is accomplished by insuring a fixed braking distance between the linings and the brake drum. In addition, by providing for an adjustment of the lower pivot on the two sections of the brake, the full braking power of the cylinder is always available and the angle of contact between the brake linings and the drum will be at the maximum set efficiency regardless of the wear on the linings. Other advantages of this construction will be readily apparent to a person skilled in the art.

I claim:

1. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar and a fixed pivot on the braking member extending into said slot, said block being rotatable to allow for arcuate movement of said bar, said braking members having slots adjacent their lower ends and a fixed pivot extending into each of said slots whereby a floating pivot is formed between the slotted ends of said braking members and said pivots.

2. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, and additional adjusting means pivotally connected to the free end of said bar and in contact with said rotating member for adjusting the position of said braking members to compensate for the wear of the brake lining.

3. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said braking members having slots adjacent their lower end, and a fixed pivot extending into each of said slots to form a floating pivot for said braking members.

4. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, and additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member.

5. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, and means for preventing movement of said last named bar in one direction and permitting movement of said bar in the other direction.

6. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, and means for preventing movement of said last named bar in one direction and permitting movement of said bar in the other direction, said last named means including a block having a slot, said bar extending through said slot, and a pawl and ratchet arrangement between said bar and slot.

7. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, said braking members having slots adjacent their lower end, and a fixed pivot extending into each of said slots to form a floating pivot for said braking members.

8. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, means for preventing movement of said last named bar in one direction and permitting movement of said bar in the other direction, said braking members having slots adjacent their lower end, and a fixed pivot extending into each of said slots to form a floating pivot for said braking members.

9. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, means for preventing movement of said last named bar in one direction and permitting movement of said bar in the other direction, said last named means including a block having a slot, said bar extending through said slot, and a pawl and ratchet arrangement between said bar and slot, said braking members having slots adjacent their lower end, and a fixed pivot extending into each of said slots to form a floating pivot for said braking members.

10. In a brake having a rotating member, a pair of lined braking members spaced from said rotating member and means for pivoting the braking members against the rotating members to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, said braking members having slots adjacent their lower end, a fixed pivot extending into each of said slots to form a floating pivot for said braking members, and means for retaining said pivot point in adjusted position in said slot.

11. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, said braking members having slots adjacent their lower end, a fixed pivot extending into each of said slots to form a floating pivot for said braking members, and means for retaining said pivot point in adjusted position in said slot, said means including a block mounted on each braking member and having a slot, a bar having one end attached to said fixed pivot and extending into said slot, and a pawl and ratchet arrangement between said bar and slot for preventing sliding movement of said bar in said slot in one direction.

12. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said braking members having slots adjacent their lower end, a fixed pivot extending into each of said slots to form a floating pivot for said braking members, and means for retaining said pivot point in adjusted position in said slot.

13. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, said braking members having slots adjacent their lower end, a fixed pivot extending into each of said slots to form a floating pivot for said braking members, and means for retaining said pivot point in adjusted position in said slot.

14. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, said braking members having slots adjacent their lower end, a fixed pivot extending into each of said slots to form a floating pivot for said braking members, and means for retaining said pivot point in adjusted position in said slot, said means including a block mounted on each braking member and having a slot, a bar having one end attached to said fixed pivot and extending into said slot, and a pawl and ratchet arrangement between said bar and slot for preventing sliding movement of said bar in said slot in one direction.

15. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, means for preventing movement of said last named bar in one direction and permitting movement of said bar in the other direction, said braking members having slots adjacent their lower end, a fixed pivot extending into each of said slots to form a floating pivot for said braking members, and means for retaining said pivot point in adjusted position in said slot.

16. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, means for preventing movement of said last named bar in one direction and permitting movement of said bar in the other direction, said braking members having slots adjacent their lower end, a fixed pivot extending into each of said slots to form a floating pivot for said braking members, and means for retaining said pivot point in adjusted position in said slot, said means including a block mounted on each braking member and having a slot, a bar having one end attached to said fixed pivot and extending into said slot, and a pawl and ratchet arrangement between said bar and slot for preventing sliding movement of said bar in said slot in one direction.

17. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, means for preventing movement of said last named bar in one direction and permitting movement of said bar in the other direction, said last named means including a block having a slot, said bar extending through said slot and a pawl and ratchet arrangement between said bar and slot, said braking members having slots adjacent their lower end, a fixed pivot extending into each of said slots to form a floating pivot for said braking members, and means for retaining said pivot point in adjusted position in said slot.

18. In a brake having a rotating member, a pair of lined braking members spaced from said rotating member and means for pivoting the braking members against the rotating member to apply the brake, a self-adjusting device for maintaining a predetermined spacing between the braking members and the rotating member regardless of the wear on the lining, comprising a retaining block mounted adjacent the pivot point of said braking members, said retaining block having a slot, a bar slidable in said slot, a pawl and ratchet combination on said block and bar to permit sliding movement of said bar in one direction and prevent sliding movement of said bar in the opposite direction, a slot in said bar adjacent the free end thereof, a fixed pivot on the braking member extending into said slot, additional adjusting means pivotally connected to the free end of said bar and in contact with said rotating member for adjusting the position of said braking members to compensate for the wear of the brake lining, said means comprising a pivot lever mounted on each braking member and having one end pivotally connected to the free end of said bar, the other end of said lever being pivotally connected to an adjusting bar extending through each braking member in contact with said rotating member, means for preventing movement of said last named bar in one direction and permitting movement of said bar in the other direction, said last named means including a block having a slot, said bar extending through said slot and a pawl and ratchet arrangement between said bar and slot, said braking members having slots adjacent their lower end, a fixed pivot extending into each of said slots to form a floating pivot for said braking members, and means for retaining said pivot point in adjusted position in said slot, said means including a block mounted on each braking member and having a slot, a bar having one end attached to said fixed pivot and extending into said slot, and a pawl and ratchet arrangement between said bar and slot for preventing sliding movement of said bar in said slot in one direction.

References Cited in the file of this patent

UNITED STATES PATENTS

| | | |
|---|---|---|
| 2,002,139 | Des Rosiers | May 21, 1935 |
| 2,168,646 | Goepfrich | Aug. 8, 1939 |
| 2,215,568 | Schnell | Sept. 24, 1940 |

FOREIGN PATENTS

| | | |
|---|---|---|
| 384,829 | Germany | 1923 |